Figure 1:
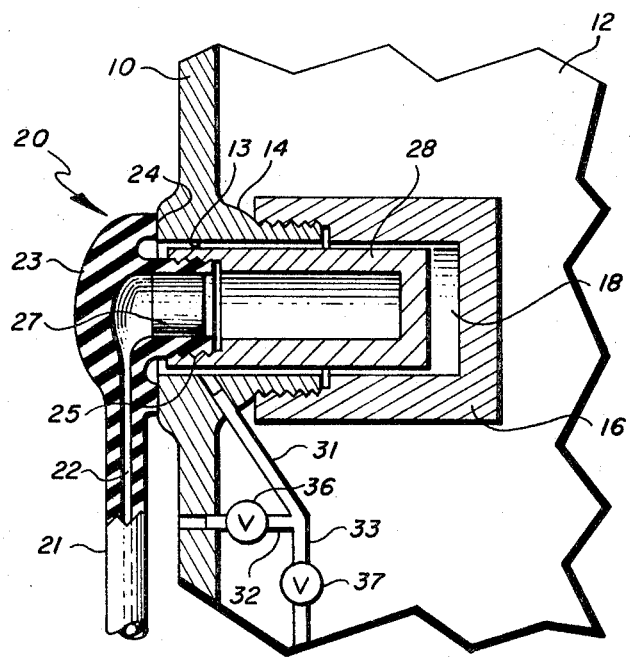

United States Patent

[11] 3,588,781

[72] Inventor James L. Williams
 Cerritos, Calif.
[21] Appl. No. 865,328
[22] Filed Oct. 10, 1969
[45] Patented June 28, 1971
[73] Assignee North American Rockwell Corporation,
 El Segundo, Calif.

[54] BULKHEAD CONNECTOR MEANS
 8 Claims, 2 Drawing Figs.
[52] U.S. Cl. ................................................ 339/12,
 339/94, 339/117
[51] Int. Cl. .................................................. H01r 13/52
[50] Field of Search .......................................... 339/12, 94,
 117; 174/9, 705; 285/23; 175/104, 105

[56] References Cited
UNITED STATES PATENTS
1,764,273 6/1930 Millikan ...................... 174/9
2,138,735 11/1938 Ellis ............................ 339/12

3,324,449 6/1967 McLoad ...................... 339/117
Primary Examiner—Marvin A. Champion
Assistant Examiner—Joseph H. McGlynn
Attorneys—L. Lee Humphries, Charles F. Dischler and
 Dominick Nardelli ABSTRACT: A bulkhead connector means, capable of withstanding a hydrostatic pressure of about 6000 feet of water and being readily disconnected and replaced while under about 6000 feet of water, has an end portion that forms an annular pressure seal around an aperture formed in the bulkhead of a vessel, the aperture being sealed by a suitable cover, removable from the interior thereof. After the end portion is placed against the aperture on the exterior side of the bulkhead, the sea water is drained from the cavity thus formed so that the hydrostatic pressure forms the pressure seal around the aperture by pressing the connector tightly thereagainst. From the interior of the vessel the cover is removed exposing the end portion and the connection is made thereto.

Patented June 28, 1971

3,588,781

INVENTOR.
JAMES L. WILLIAMS

ATTORNEY

BULKHEAD CONNECTOR MEANS

This invention relates generally to a bulkhead lead-through that is fluid-proof and more particularly to a lead-through that can be readily and simply replaced underwater.

Future crude oil supplies will be obtained from oil wells drilled deep below the surface of the ocean. At the present time, economics makes the exploitation of crude oil on ocean floors more than a couple of hundred feet deep impractical. In order to deliver crude oil from wells 2000 or more feet below sea level, permanent underwater vessel or habitats for workmen are being considered to aid in delivering the oil to the ocean surface. These habitats will be sufficiently large to contain oil storage tanks, well maintenance equipment, and livable quarters. Utilities will be supplied to the underwater vessel by pipe lines and cables extending to the surface. These pipe lines and cables should extend through the bulkhead of the vessel. Normally, a permanent lead-through in the bulkhead can be made leak-proof and tight. However, if a cable or line breaks and must be replaced, known means cannot be used to replace the cable underwater because of a number of factors. One factor is that drivers cannot perform at such depths, and suitable submarines with complicated manipulators must be used. Therefore, the lead-through or the connection through the bulkhead must be simple. In addition, because sea water is conductive and corrosive, when an electrical cable is to be connected, the ends of the conductors must be shielded so as not to come in contact with sea water.

Therefore an object of this invention is to produce a bulkhead connector that is simple in construction and can be readily connected and disconnected under water.

Another object is to provide a waterproof and watertight connector that can withstand relatively high hydrostatic pressures.

Another object is to provide a connector that can be replaced by a submarine using simple manipulators.

Figure 2:
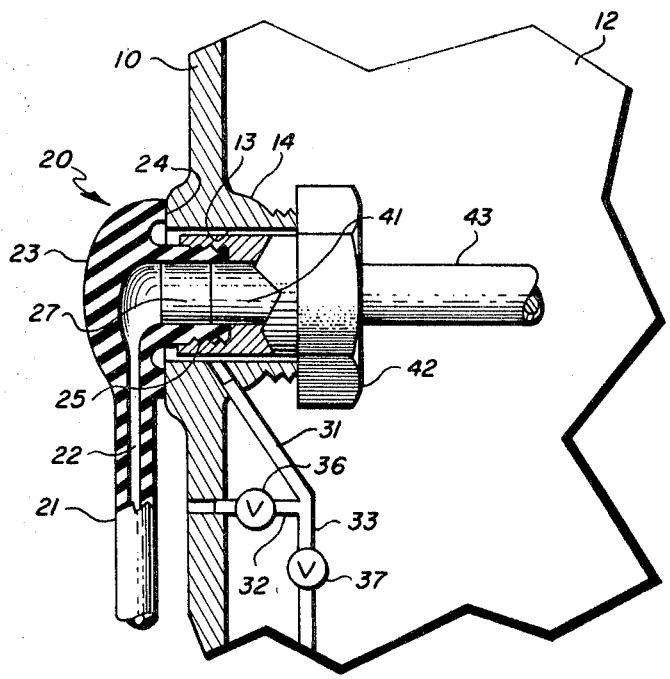

These and other objects and features of advantage will become more apparent from the following description of the invention and the accompanying drawing, in which:

FIG. 1 is a sectional view of the portion of the bulkhead showing the novel connector means as will be used with an electric cable after it has been inserted into the bulkhead by a submarine; and FIG. 2 shows the novel connector means of FIG. 1 after an electrical cable has been connected thereto.

Referring to the drawing and to FIG. 1 in particular, there is shown a cross section of a portion of a bulkhead 10 for an underwater habitat or vessel 12 (partially shown). An aperture 13 is formed through the bulkheads and a threaded boss 14 is provided around the aperture 13 on the inside of the bulkhead. Threaded on and sealed to boss 14 is a cup-shaped cover 16 thereby providing a watertight closure over the aperture 13 and forming a cavity 18 that communicates with the exterior side of the bulkhead 10. The cover 16 and boss 14 are designed by conventional methods so that hydrostatic pressure equal to, for example, up to 6000 feet of water can be restrained. Within the cavity 18 is disposed one end of a conductor 20 which end has a novel configuration so that it can form a suitable seal and can be inserted within the cavity 18 by a manned submarine operating outside of the vessel 12. The conductor 20 may be an electric cable, fluid pipe or any other means that may carry the required utilities to the vessel. In this embodiment conductor 20 is an electric cable that has an insulator 21 enclosing electrical leads or conductors 22.

The insulator 21 is formed integral with a button-shaped cap 23 which has an annular pressure-sealing surface 24 formed around a threaded projection 25. Within the projection 25 is disposed socket 27 in which the end of the electrical leads 22 terminate. On projection 25 is threaded a cable protector 28 which is of a size such that it can be removed by an operator within the vessel 12 when the end of the cable is placed in the position shown in FIG. 1. Also in the bulkhead 10 are disposed two tubes 31 and 32. Tube 31 communicates with cavity 18 at one end and, at the other end, with tube 32 and another tube 33. The other end of the tube 32 communicates with the exterior of the vessel 12. In tube 32 and accessible from the inside of the vessel is a valve 36. Another valve 37 is disposed in tube 33. The other end of tube 33 can drain into a suitable sump (not shown) within the vessel 12.

The cable 20 is connected to the vessels by using a submarine (not shown) such as described in U.S. Pat. No. 3,434,295. The submarine grabs the end of the cable 20 by one of its manipulators, while the cable is underwater. The submarine maneuvers and inserts the protector 28 through the aperture 13 and into the cavity 18 and holds the cap 23 so that surface 24 bears against the bulkhead 10. The operator within the vessel 12 first makes certain that valve 36 is closed and opens valve 37 causing the sea water to drain from cavity 18 so that the cavity 18 is at the same pressure as in the inside of the vessel. Now the hydrostatic pressure holds cap 23 against the bulkhead forming a fluidtight seal around the aperture 13. The cover 16 is removed and next the protector 28 is removed exposing the ends of the electrical leads in socket 27. A mating socket 41 on a cable 43 (see FIG. 2) is plugged into socket 27 and a cable connector bushing having a flange which bears against the boss 14, provides a mechanical clamp to ensure that the seal formed between cap 23 and the bulkhead is not disturbed. The cable 20 is removed by reversing the above procedure, except that valve 37 is closed before valve 36 is open to cause the pressure within cavity 18 to be the same as hydrostatic pressure.

From the foregoing explanation of the invention, modifications and changes therein will become apparent to those skilled in the art. Accordingly, the invention is not limited to the specific details of the described exemplary embodiment but only as indicated by the scope of the following claims:

I claim:

1. A bulkhead connector means comprising:
    a bulkhead having an aperture;
    a cover closing said aperture and disposed to be removed and replaced from one side of said bulkhead;
    a conductor having a cap means formed on one end thereof;
    an annular sealing means disposed on said cap means;
    said conductor, bulkhead and cover forming a cavity when said sealing means is adjacent said bulkhead; and
    means for lowering the pressure within said cavity so that ambient pressure urges said sealing means in sealing relation around said aperture when said sealing means is adjacent said bulkhead.

2. The means of claim 1 wherein a removable protector is disposed over the end of said conductor and surrounded by said sealing means, said protector is made to be removable when said sealing means is adjacent said bulkhead and said cover removed.

3. The means of claim 1 wherein said means for lowering pressure includes:
    a tube communicating said cavity with the side of said bulkhead in which said cover is disposed; and
    a valve disposed in said tube.

4. The means of claim 3 wherein a removable protector is disposed over the end of said conductor and surrounded by said sealing means, said protector is made to be removable when said sealing means is adjacent said bulkhead and said cover removed.

5. The means of claim 3 wherein additional means are provided to communicate the cavity with the side of said bulkhead opposite from said cover so that the pressure within said cavity can be increased whenever said connector is to be removed.

6. The means of claim 5 wherein a removable protector is disposed over the end of said conductor and surrounded by said sealing means, said protector is made to be removable when said sealing means is adjacent said bulkhead and said cover removed.

7. A connector means for connecting a conductor through an aperture in a bulkhead, said means comprising:
    a conductor;
    a cap means formed on one end of said conductor;

an annular sealing means disposed on said cap means and around said conductor;

a removable protector disposed over the end of said conductor, and said sealing means being further disposed to form a pressure seal with said bulkhead around said aperture when said cap means is urged against said bulkhead.

8. A method of forming a connection through an aperture in a bulkhead when the pressure outside the bulkhead is larger than the pressure inside the bulkhead, said method comprising:

closing said aperture from the inside of said bulkhead to withstand the pressure differential;

placing the end of a conductor into said aperture from the outside of said bulkhead so that said conductor engages the periphery of said aperture;

reducing the pressure in the cavity thus formed to cause the pressure differential to form a seal between the conductor and said bulkhead; and opening said aperture from the inside to expose the end of the conductor to the interior thereof.